3,351,468
THIOPHENE COMPOUNDS USED AS COLOR COUPLERS FOR MAGENTA DYESTUFFS
Alfred Froehlich, Marly-le-Grand, Switzerland, assignor to Ciba Limited, Basel, Switzerland, a company of Switzerland
No Drawing. Filed Jan. 14, 1964, Ser. No. 337,543
Claims priority, application Switzerland, Jan. 19, 1963, 647/63
8 Claims. (Cl. 96—56.3)

The present invention provides new thiophene compounds in which the thiophene ring is substituted by two cyanoacetyl groups and a process for their manufacture. The invention also includes the use of the new thiophene compounds as color couplers for magenta dyestuffs, more especially in light-sensitive photographic layers for the color coupling development process.

The thiophene compounds correspond to the formula (1) 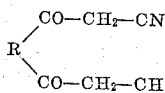

where R represents a thiophene radical which advantageously contains further substituents. The thiophene compounds to be used in the present process may also be represented by the general formula (2) 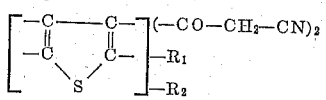

wherein $R_1$ and $R_2$ which may be identical or different each represents a hydrogen atom or preferably a substituent, or $R_1$ and $R_2$ may together form a further ring system condensed with the thiophene ring.

The cyanoacetyl group may be linked with the thiophene ring in any desired position, for example in the 2:4- or preferably 2:5-position. In the latter case the thiophene compounds have the formula (3) 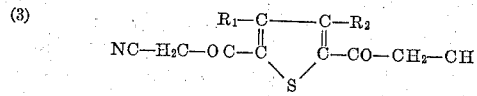

in which $R_1$ and $R_2$ have the above meanings.

Those thiophene compounds are usually of particular value in which at least one of the substituents $R_1$ and $R_2$ is a radical capable of inhibiting diffusion, for example a benzene, diphenyl, terphenyl, alkylaryl or naphthalene radical, or a higher aliphatic radical such as an acylamino group contining at least 10 carbon atoms. In the Formula 3 $R_1$ and $R_2$ may be, for example, aromatic radicals, which may be further substituted by alkyl groups, which contain together at least 12 carbon atoms. This is the case, inter alia, with thiophene compounds of the formula (4) 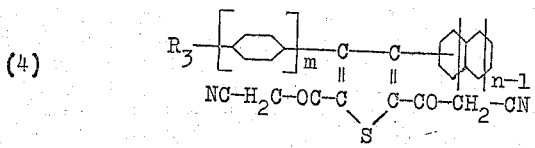

where $R_3$ represents a higher alkyl radical with, for example, at least 8 carbon atoms or a benzene radical and $m$ and $n$ each is 1 or 2.

The thiophene compounds of the Formula 1 are advantageously manufactured by reacting the corresponding dicarboxylic acid diesters with acetonitrile in the presence of a condensing agent such as an alkali metal alkylate, sodamide or an alkali metal. It has been found especially advantageous to carry out these reactions with addition of a hydride of an alkaline earth metal. The manufacture of certain corresponding thiophene-dicarboxylic acids of the formula (5) 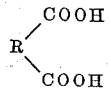

where R has the meaning defined above—is known. For example, thiophene-dicarboxylic acids can be prepared by reacting 1:2-diketones, in which the keto carbon atoms may also be members of a cyclic system, with a thioglycollic acid ester. In this manner Rinsberg (Berichte, 43, page 901 and 45, page 2414) and Seka (Berichte, 58, page 1783) have obtained thiophene-2:5-dicarboxylic acid and its derivatives from diacetyl, benzil, phenanthenequinone and acenaphthene. Other derivatives of thiophene-2:5-dicarboxylic acid have been prepared by the authors named from oxylic acid esters and pyruvic acid esters by reaction with thiodiglycollic acid esters. Thiophene-2:5-dicarboxylic acid is also accessible by the process disclosed in French specification 1,308,392 by reacting in an aqueous medium, preferably without intermediate isolation, alkali or alkaline earth metal salts of $\alpha:\alpha'$-dichloroadipic acid with alkali metal sulfides, converting the resulting salts of tetrahydrothiophene-2:5-dicarboxylic acid into the free dicarboxylic acid, treating the tetrahydrothiophene-2:5-dicarboxylic acid in an acid medium with molecular chlorine and eliminating hydrogen chloride from the resulting chlorination product in an acid medium.

As will be realized from the foregoing it is of advantage to use as starting materials or the manufacture of compounds of Formula 1 or of the thiophene-dicarboxylic acids those diketones which contain at least one radical that hinders diffusion, for example an alkyl radical of high molecular weight or a plurality of benzene radicals. Such diketones are, for example, benzil compounds of which one benzene nucleus is substituted by a higher alkyl radical, for example, benzil compounds of which one benzene nucleus is substituted by a higher alkyl radical, for example a stearyl-(n-octadecyl) group. Furthermore, there may be mentioned in this connection dodecyl-diphenylyl-phenyl diketone, dodecyl-diphenylylmethyl diketone, dodecyl-phenylmethyl diketone, dodecylphenylnaphthyl diketone, terphenylylphenyl diketone, and diphenylyl-diphenylyl diketone. These higher diketones are not known; they are advantageously prepared from corresponding benzoins by oxidation with selenium dioxide. Other diketones suitable for the manufacture of dicyanoacetyl thiophenes are 4:4'-bis-(dialkylamino)-benzils; such compounds have been described, for example, in Organic Syntheses, volume 41 (1961).

Another process for the manufacture of thiophene-dicarboxylic acids has been described by W. Toepfl (Dissertation, Technical University, Stuttgart [1961]) who reacted ketene mercaptals with haloacetic acid esters to form substituted thiophene-dicarboxylic acids and thereby obtained, inter alia, compounds of the formula (6) 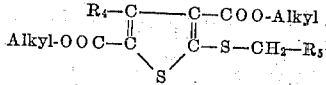

where $R_4$ represents an amino group and $R_5$ a hydrogen atom or one of the groups —$COOCH_3$, —CN, —COOH or —$COOC_2H_5$. The amino group $R_4$ enables further substituents to be introduced, preferably such as hinder diffusion or increase the solubility in water, for instance radicals of higher fatty acids or of dodecylsuccinic acid. In this way esters of the Formula 6 yield dicyanoacetyl thiophenes of the formula (7) 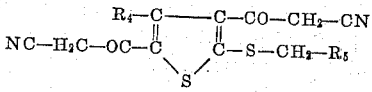

where $R_4$ represents an amino group which advantageously is further substituted, and $R_5$ stands for one of the groups mentioned above.

According to the present invention the thiophene compounds containing cyanoacetyl groups are suitable for use as color couplers for magenta dyes in light-sensitive photographic layers; they are readily accessible, and the magenta dyes which they form on color development by coupling display very favourable absorptive properties, since they substantially suppress green light and do not appreciably absorb in the blue and red regions of the spectrum. Furthermore, the color couplers are distinguished by their very good coupling properties and, when added as diffusion-resistant couplers to the silver halide emulsion before casting, have very little influence on the speed of photographic layers containing them. They also possess the advantageous property that, in areas where no coupling takes place, they do not discolor any white portions of the image. In the form of their alkali metal compounds they are soluble in water.

The following examples illustrate the invention. In the examples which explain the manufacture or use of the new compounds parts and percentages are by weight.

EXAMPLE 1

2:5 - dicyanoacetyl - 3 - phenyl - 4 - para - dodecylphenyl thiophene

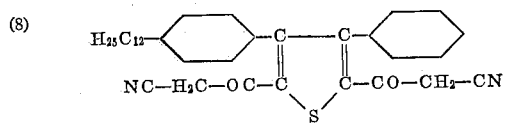

(a) *Dodecylbenzene.*—A mixture of 605 g. of lauroylbenzene (prepared in known manner from benzene, lauroyl chloride and aluminium chloride), 140 g. of hydrazine hydrate and 420 g. of potassium hydroxide in 800 cc. of diethylene glycol is refluxed and stirred for 4 hours at 140° C. The condenser is then removed and the whole further heated to 220° C. The condenser is then replaced and the batch heated for 20 hours at 220° C., poured into ice-water, suction-filtered and the filter cake washed with water; it is then dried and distilled under 2 mm. Hg pressure at 150° C. Yield: about 490 g.

(b) *Phenacetyl-dodecylbenzene.*—470 g. of dodecylbenzene are dissolved with 300 g. of phenacetyl chloride in 500 cc. of carbon disulfide and 300 g. of aluminium chloride are added. The whole is worked up in the usual manner, and the phenacetyl-dodecylbenzene distilled under 2 to 3 mm. Hg pressure at 240° to 250° C. After recrystallization from petroleum ether the product melts at 60° C. Yield: about 410 g.

(c) *Phenyl-dodecylphenyl diketone.*—A mixture of 329 g. of phenylacetyl dodecylbenzene, 250 g. of selenium dioxide and 400 cc. of benzene is boiled and stirred for 18 hours; the selenium is then suction filtered and the benzene removed by distillation. The residue is distilled under 2 to 3 mm. Hg pressure at about 250° C. Yield: about 290 g.

(d) *3 - phenyl - 4 - dodecylphenyl - thiophene - 2:5-dicarboxylic acid.*—A mixture of 270 g. of phenyl-dodecylphenyl diketone, 155 g. of thiodiglycollic acid diethyl ester, 800 cc. of benzene and 1300 cc. of methanol containing 116 g. of sodium is stirred for 72 hours at room temperature. 3 liters of water are then added and the benzene is distilled off. The remaining solution is mixed with hydrochloric acid, the resulting precipitate suctioned off, the residue dried and extracted with benzine. After recrystallization from alcohol about 266 g. of product are obtained melting at 230° to 235° C.

(e) *3 - phenyl - 4 - dodecylphenyl - thiophene - 2:5-dicarboxylic acid ester.*—266 g. of the compound (d) in 1700 cc. of methanol are boiled for 12 hours while passing a current of hydrochloric acid gas through the mixture. The batch is then poured over ice, suction filtered and washed with water. The residue is pasted with 1 liter of 5% sodium carbonate solution, suction filtered, washed with water, dried and crystallized from alcohol. Melting point: 94° C. Yield: about 240 g.

(f) *2:5-dicyanoacetyl - 3 - phenyl-4-para-dodecylphenyl thiophene.*—A solution of 10 g. of the compound (e) in 150 cc. of benzene is mixed with 5 g. of dry sodium methylate and 6 cc. of acetonitrile and refluxed for 24 hours. The benzene is evaporated under vacuum and the residue extracted for 24 hours with acetone. The sodium compound of 2:5-dicyanoacetyl-3-phenyl-4-para-dodecylphenyl thiophene which remains can be used as a magenta coupler in the color coupling development process.

EXAMPLE 2

2:5-dicyanoacetyl-3-phenyl-4-para-dodecyldiphenyl thiophene

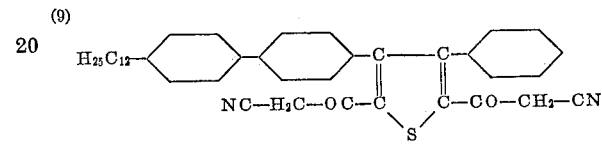

(a) *Lauroyl diphenyl.*—Is prepared in known manner by condensing diphenyl with lauroyl chloride in the presence of aluminum chloride. Melting point: 99° to 100° C. Distillation temperature under about 5 mm. Hg pressure: 250° to 270° C.

(b) *Dodecyl diphenyl.*—Dodecyl diphenyl is prepared from lauroyl diphenyl as described in Example 1(a). Melting point: 60° C. Distillation temperature under 2 to 3 mm. Hg pressure: 200° to 220° C.

(c) *Phenacetyldodecyl diphenyl.*—A solution of 165 g. of dodecyl diphenyl in 300 cc. of carbon disulfide is condensed with 80 g. of phenacetyl chloride in the presence of 125 g. of aluminium chloride. The products is precipitated with water, while advantageously allowing the temperature to rise so that the carbon disulfide distills off; 100 cc. of hydrochloric acid and ice is then added, and the precipitate suction filtered, washed with water, dried and twice recrystallized from benzene. Melting point: 120° C. Yield: about 140 g.

(d) *Dodecyldiphenylyl-phenyl diketone.*—A mixture of 80 g. of phenacetyl-dodecyl diphenyl, 200 cc. of benzene and 54 g. of selenium dioxide is stirred an boiled for 18 hours. While still hot, the selenium is suction filtered, the benzene drawn off and the residue distills under about 2 mm. Hg pressure. Distillation temperature. 310° to 320° C. The distillate is recrystallised twice from petroleum ether with addition of active carbon. Melting point: 64° C. Yield: about 58 g.

(e) *3-phenyl - 4 - dodecylidiphenylyl-thiophene-2:5-dicarboxylic acid.*—A mixture of 165 g. of the compound (d), 500 cc. of benzene, 77.5 g. of thiodiglycollic acid diethyl ester and 700 cc. of methanol containing 30 g. of sodium is stirred for 48 hours at room temperature, then mixed with 3 liters of water and the benzene distilled off, to leave a clear solution from which the product is precipitated with hydrochloric acid. The product is suction filtered, washed with water, and the residue twice recrystallized from alcohol. Yield: about 152 g.

(f) *3-phenyl - 4 - dodecyldiphenylyl-thiophene - 2:5-dicarboxylic acid dimethyl ester.*—Esterification is carried out as in Example 1.

(e) The products melts at 101° C.

(g) *2:5-dicyanoacetyl - 3 - phenyl-4-para-dodecyldiphenylyl-thiophene.*—A solution of 6 g. of the compound (f) in 100 cc. of dry benzene is mixed with 4 g. of dry tertiary sodium butylate and 5 cc. of acetonitrile and refluxed for 24 hours. The benzene is distilled off and the residue extracted for 24 hours with acetone, to leave the sodium compound of 2:5-dicyanoacetyl-3-phenyl-4-para-dodecyldiphenylyl-thiophene. This compounds is suitable

EXAMPLE 3

2:5-dicyanoacetyl-3-α-naphthyl-4-para-diphenyl-thiophene (10)

(a) *α-Naphthacetyl-diphenyl.*—85 g. of aluminium chloride are added to a solution of 85 g. of naphthacetyl chloride and 68 g. of diphenyl in 200 cc. of carbon disulfide. The mixture is boiled for 15 minutes and then poured into water so that heat of reaction causes the carbon disulfide to distill off. Ice and hydrochloric acid are then added and the batch suction-filtered. The filter residue is washed with water, dried and recrystallized from 2.5 liters of xylene. Melting point: 200° to 205° C. Yield: about 45 g.

(b) *Diphenylyl-α-naphthyl diketone.*—A mixture of 40 g. of the compound (a), 150 cc. of xylene and 33 g. of selenium dioxide is boiled and stirred for 18 hours, and while still hot the selenium is suction filtered. The xylene is drawn off in vacuo and the residue distilled under 2 to 3 mm. Hg pressure above 400° C. The distillate is crystallised from benzene with addition of carbon. Melting point 200° to 205° C. Yield: about 33 g.

(c) *3-α-naphthyl - 4 - diphenylyl-thiophene - 2:5 - dicarboxylic acid.*—A mixture of 29 g. of the compound (b), 150 cc. of benzene, 17.5 g. of thiodiglycollic acid diethyl ester and 100 cc. of methanol containing 7.8 g. of sodium is stirred for 48 hours at room temperature. The batch is then diluted with 2 liters of water and the benzene distilled off. The residual solution is filtered and acidified with hydrochloric acid. The products is suction filtered, washed with water and dried. Melting point: about 300° C. with decomposition. Yield: about 25 g.

(d) *3-α-Naphthyl-4-diphenylyl-thiophene - 2:5 - dicarboxylic acid dimethyl ester.*—30 g. of the compound (c) in 500 cc. of methanol are boiled for 24 hours with passage of a current of hydrochloric acid gas, then poured into ice-water and suction-filtered. The residue is washed with water, pasted with 200 cc. of 5% sodium bicarbonate solution, suction-filtered, the filter residue washed with water and recrystallized from glacial acetic acid with addition of active carbon. Melting point: 185° C. Yield: about 25%.

(e) *2:5-dicyanoacetyl-3-α-naphthyl-4-para-diphenylyl-thiophene.*—A solution of 8 g. of compound (d) in 100 cc. of dry dioxane is mixed with 4 g. of dry sodium methylate and 5 cc. of acetonitrile and boiled for 24 hours. The dioxane is distilled off under vacuum and the residue extracted with acetone for 24 hours, to leave the sodium compound of 2:5-dicyanoacetyl-3-α-naphthyl-4-para-diphenylyl thiophene. This can be used as purple coupler in the color coupling development process.

EXAMPLE 4

2:5-dicyanoacetyl-3-phenyl-4-para-terphenylylthiophene (11)

(a) *Phenacetyl terphenyl.*—100 g. of aluminium chloride are added to a mixture of 115 g. of terphenyl, 77.5 g. of phenacetyl chloride and 200 cc. of carbon disulfide, the whole is boiled for 15 minutes and then poured into ice water; 100 cc. of hydrochloric acid are added, the batch is suction filtered and the residue washed with water. It is then stirred with 1 liter of methanol, filtered, stirred with another liter of methanol, suctioned, dried and recrystallized from 1.5 liters of dimethylformamide. The product melts at about 250° C. Yield: about 110 g.

(b) *Terphenylylphenyl diketone.*—A mixture of 87 g. of phenacetyl terphenyl, 400 cc. of mesitylene and 34 g. of selenium dioxide is boiled and stirred for 18 hours. While still hot, the selenium is suction filtered and the filtrate cooled. The precipitated diketone is recrystallized from benzene; it melts at 192° C. Yield: about 58 g.

(c) *3 - phenyl-4-terphenylyl-thiophene-2:5-dicarboxylic acid.*—A mixture of 14.3 of the compound (b), 300 cc. of benzene, 10.6 g. of thiodigylcollic acid diethyl ester and 100 cc. of methanol containing 4 g. of sodium is stirred for 48 hours at room temperature. 1 liter of water is then added and the benzene distilled off. The distillation residue is filtered and acidified with hydrochloric acid. After suction filtering, washing and drying, the product is dissolved in a few cc. of pyridine, mixed with 100 cc. of methanol, suction filtered with heating, cooled, suction filtered and washed with methanol; it melts above 300° C. Yield: about 9 g.

(d) *3-phenyl-4-terphenylyl-thiophene-2:5-dicarboxylic acid dimethyl ester.*—15 g. of the compound (c) are boiled for 12 hours in 300 cc. of methanol with passage of a current of hydrochloric acid gas, then poured over ice, suction filtered, the residue washed with water and triturated with 200 cc. of 5% sodium bicarbonate solution, suction filtered, and the residue washed with water, dried and recrystallized from glacial acetic acid; it melts at 185° C. Yield: about 14 g.

(e) *2:5-dicyanoacetyl-3-phenyl-4-para-terphenylyl thiophene.*—A mixture of 10 g. of the compound (e), 150 cc. of pure benzene, 5 g. of carefully dried, powdered sodium methylate and 6 cc. of acetonitrile is boiled and stirred for 36 hours. The benzene is then evaporated and the residue comminuted and extracted with acetone for 24 hours. The residue is the sodium compound of 2:5-dicyanoethyl-3-phenyl-4-para-terphenylyl thiophene which is suitable as a magenta coupler in the color coupling development process.

EXAMPLE 5

2:5-dicyanoacetyl-3-α-naphthyl-4-para-dodecyldiphenylyl thiophene (12)

(a) *Dodecyl diphenyl* is prepared as described in Examples 2 (a) and (b).

(b) *α-Naphthacetyl-dodecyl diphenyl.*—100 g. of aluminium chloride are introduced into a solution of 90.8 g. of naphthacetyl chloride and 150 g. of dodecyl diphenyl in 250 cc. of carbon disulfide. The reaction solution is boiled for 15 minutes, and poured into water so that the carbon disulfide distilled off. Ice and 100 cc. of hydrochloric acid are then added, the whole is suction-filtered, and the residue washed with water, dried and crystallized twice from benzene with addition of active carbon; the product melts at 150° C. Yield: about 104 g.

(c) *Dodecyldiphenylyl-α-naphthyl diketone.*—A mixture of 55 g. of the compound (b), 40 g. of selenium dioxide and 150 cc. of xylene is boiled for 15 hours; while still hot the selenium is suction filtered and the benzene evaporated. The residue is recrystallized twice from benzine with addition of carbon; the product melts at 88° C. Yield: about 45 g.

(d) *3-α-naphthyl-4-dodecyldiphenylyl-thiophene-2:5-dicarboxylic acid.*—A mixture of 10.9 g. of the compound (c), 50 cc. of benzene, 4.6 g. of thiodiglycollic acid ethyl ester and 50 cc. of methanol containing 1.5 g. of sodium is stirred for 72 hours at room temperature, 100 cc. of water are added and the benzene evaporated. The residual solution is filtered, acidified with hydrochloric acid, and then suction-filtered. The residue is washed with water, dried and crystallized from isopropanol. Yield: about 8 g.

(e) *3-α-naphthyl-4-dodecyldiphenylyl-thiophene-2:4 - dicarboxylic acid dimethyl ester.*—20 g. of the compound (d) are boiled for 14 hours in a mixture of 100 cc. of benzene and 200 cc. of methanol with passage of a current of hydrochloric acid gas and then poured over ice, suction filtered, and washed with water. The residue is pasted with 5% sodium bicarbonate solution, heated to 50° C., suction filtered, washed with water, dried and twice recrystallized from benzene; the product melts at 103° C. Yield: about 15 g.

(f) *2:5-dicyanoacetyl-3- -naphthyl - 4 - para-dodecyldiphenylyl thiophene.*—A mixture of 8 g. of the compound (e), 100 cc. of benzene, 6 cc. of acetonitrile and 4 g. of dry sodium ethylate is stirred and heated at the boil for 24 hours. The benzene is then distilled off in vacuo and the residue extracted for 24 hours with acetone. The sodium compound of 2:5-dicyanoacetyl-3-α-naphthyl - 4- para-dodecyldiphenylyl thiophene which remains can be used as a magenta coupler in the color coupling development process.

EXAMPLE 6

*2-methylmercapto-3:5-dicyanoacetyl-4-lauroylamino thiophene*

(13) 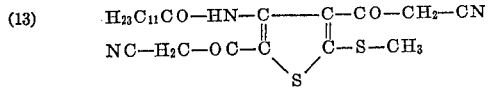

(a) *Reaction of cyanoacetic ester with carbon disulfide*

(14) 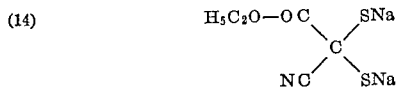

A solution of 40.2 g. of sodium (=1.75 mols) in 500 cc. of methanol is made up to 525 cc. 300 cc. of this solution are mixed in a three-neck flask (equipped with agitator, dropping funnel and thermometer) at 20° C. with 90 cc. of cyanoacetic acid ethyl ester (=1 mol), cooled to 5° and 30 cc. of carbon disulfide (0.5 mol) are dropped in, the temperature being kept at a maximum of 20° C. Another 150 cc. of the methylate solution were added, the whole is cooled to 10° C. and 15 cc. of carbon disulfide (=0.25 mol) are added dropwise. Finally, the remainder of the methylate solution and another 7.5 cc. of carbon disulfide (0.125 mol) are added. The resulting yellow solution contains the sodium salt of Formula 14 and can be used for further reactions as such.

(b) *1-cyano-2-mercapto-2-methylmercapto-acrylic acid ethyl ester*

(15) 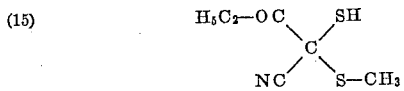

A soluton prepared as described under (a) is mixed dropwise with 83 cc. of dimethyl sulfate (=0.875 mol)- maximum temperature 20° C. The batch is then stirred for 1 hour at room temperature, made up to 2 liters with water and acidified with concentrated sulfuric acid. The resulting crystal magma is suction filtered, washed with dilute hydrochloric acid, dried in vacuo over potassium hydroxide and recrystallized from methanol. The product forms small, substantially colorless crystals melting at about 145° C. with decomposition (discoloration set in at 80° C.). Yield: about 142 g.

(c) *2-methylmercapto-4-aminothiophene-3:5 - dicarboxylic acid diethyl ester*

(16) 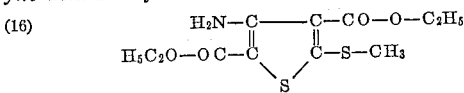

A mixture of 0.9 g. of sodium (=0.04 mol) dissolved in 25 cc. of methanol and 3.5 g. of the compound (b) (=0.02 mol) is shaken until all has dissolved, whereupon 4.4 cc. of bromoacetic acid ethyl ester (=0.04 mol) are added. The solution becomes hot. After 15 minutes 15 cc. of methanol are distilled off, and the residue mixed with 50 cc. of water, suction filtered, washed with water, and then twice crystallized from methanol with addition of active carbon. The product melts at 137° C. Yield: 3,4 g.

(d) *2-methylmercapto-4-lauroylamino thiophene - 3:5- dicarboxylic acid diethyl ester*

(17) 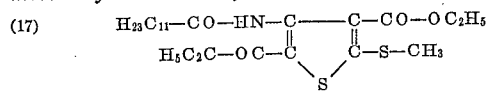

6.5 g. of the compound (c) are dissolved in 25 cc. of pyridine with stirring at the boil and 6 g. of lauroyl chloride are dropped in. The batch is then boiled for 10 minutes and tested for a free amino group. The addition of lauroyl chloride is continued until a free amino group could no longer be detected. The batch is poured over 100 cc. of ice-water, suction filtered and the residue washed with water. It is then pasted with 20 cc. of methanol, suction filtered, washed with 20 cc. of methanol, dried, recrystallized from methanol with addition of active carbon and recrystallized once more from a mixture of two parts of benzene and eight parts of benzine. The product melts at 111° C. Yield: about 5.4 g.

(e) *2-Methylmercapto-3:5-dicyanoacetyl - 4 - lauroylamino thiophene.*—A solution of 5 g. of the compound (d) in 100 cc. of benzene is mixed with 2.5 g. of dry sodium methylate and 3 g. of acetonitrile. The mixture is stirred and boiled for 24 hours. The benzene is then distilled off in vacuo and the residue extracted for 24 hours with acetone. The sodium compound of 2-methylmercapto-3:5-dicyanoacetyl-4-lauroylamino thiophene which remains can be used as a magenta coupler in the color coupling development process.

EXAMPLE 7

*2:5-dicyanoacetyl-3:4-phenanthreno-(9':10')-thiophene*

(18) 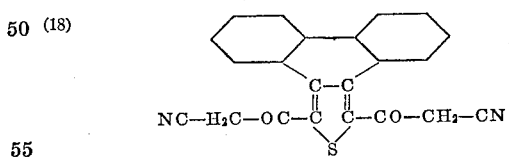

A mixture of 10 g. of 3:4-phenanthreno-(9':10')-thiophene-2:5-dicarboxylic acid (prepared as described in Berichte volume 43, page 901) and 100 cc. of methanol is boiled for 12 hours with passage of a current of hydrochloric acid gas. The batch is then poured over 300 g. of ice, suction filtered and washed with water. The residue is triturated with 100 cc. of 5% sodium bicarbonate solution, heated to 60° C., suction filtered and washed with water. The residue is dried and recrystallized from methanol and then once more from benzene with addition of active carbon. The product melts at 176° C. Yield: about 8 g.

6 g. of the resulting 3:4-phenanthreno-(9':10')-thiophene-2:5-dicarboxylic acid dimethyl ester are dissolved in 100 cc. of benzene, 2 g. of dry sodium methylate and 5 cc. of acetonitrile are added, and the whole boiled for 24 hours. The benzene is evaporated and the residue extracted for 24 hours with acetone. The sodium compound of 2:5-dicyanoacetyl - 3:4 - phenanthreno-(9':10')-thiophene which remains can be used as a magenta coupler in the color coupling development process.

EXAMPLE 8

*2:5-dicyanoacetyl-3:4-diphenyl thiophene*

(19)

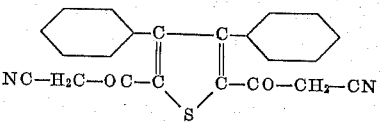

10 g. of 3:4-diphenylthiophene-2:5-dicarboxylic acid (prepared as described in Berichte 43, page 901) are esterified in usual manner with ethanol. The diethyl ester melts at 141° C.

A mixture of a solution of 6 g. of the ester in 300 cc. of benzene, 2 g. of dry sodium methylate and 5 cc. of acetonitrile is boiled for 24 hours. The benzene is evaporated and the residue extracted for 24 hours with acetone. The sodium compound of 2:5-dicyanoacetyl-3:4-diphenyl-thiophene which remains can be used as a purple coupled in the color coupling development process.

EXAMPLE 9

An exposed silver halide layer is developed in a developer of the following composition:

| | Grams |
|---|---|
| N;N-diethyl-para-phenylenediamine sulfate | 3 |
| Sodium carbonate, anhydrous | 75 |
| Sodium sulfite | 1 |
| Sodium bromide | 1 |
| Thiophene compound of the Formula 19 (described in Example 8 above) made up with water to 1 liter | 5 |

The developed photograph is washed, bleached and fixed. A blue-red dye image was obtained.

EXAMPLE 10

A solution of 12 g. of the sodium salt of 1-hydroxy-2-naphthoyl-octadecylamino-4-sulfonic acid in 300 cc. of water is added to 1 kg. of a silver halide emulsion sensitized to red light and the mixture cast on a base. This base is covered with an orthochromatically sensitized silver halide emulsion containing per kilogram 10 g. of the 2:5-dicyanoacetyl - 3 - phenyl-4-para-dodecyldiphenylyl-thiophene of the Formula 9 described in Example 2. This layer is covered with a yellow filter layer and this is then topped with a silver halide emulsion containing per kilogram 15 g. of stearoylacetylaminoisophthalic acid. The resulting tripack material can be used in customary manner for the production of color photographs, the bottom layer containing the blue image, the middle layer the magenta image and the top layer the yellow image.

EXAMPLE 11

10 g. of the 2:5-dicyanoacetyl-3-phenyl-4-paradodecyl-phenyl thiophene of the Formula 8 prepared as described in Example 1 are dissolved with the addition of 5 cc. of 40% aqueous sodium hydroxide solution at 40° C. in 300 cc. of water, and the solution mixed with 1 kg. of silver halide emulsion. The emulsion is admixed with the conventional additives, cast on a base and dried. The layer is exposed under an object and developed in a developer of the following composition:

| | Grams |
|---|---|
| N:N-diethyl-para-phenylenediamine | 3 |
| Sodium carbonate, anhydrous | 75 |
| Sodium sulfite | 1 |
| Sodium bromide | 1 |
| Made up with water to 1 liter. | |

The silver is then bleached out in known manner and the material fixed. A magenta color photograph is obtained.

Silver halide emulsions and magenta images, which may also be component images of a multipack material, may be prepared in identical manner, using a compound of the Formula 10, 11, 12, 13 or 18.

What is claimed is:

1. A light-sensitive photographic silver halide layer for the color coupling development process, which contains as a coupler for the magenta dyestuff a thiophene compound of the formula

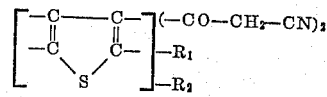

in which $R_1$ and $R_2$ each represents a member selected from the group consisting of a hydrogen atom, an aryl radical, an alkylaryl radical, an acylamino group containing at least 10 carbon atoms, a methylmercapto radical of the formula —S—$CH_2$—$R_5$, in which $R_5$ represents a member selected from the group consisting of a hydrogen atom, a —COOH, —$COOCH_3$, —$COOC_2H_5$ and —CN radical.

2. A light-sensitive photographic silver halide layer for the color coupling development process, which contains as a coupler for the magenta dyestuff a thiophene compound of the formula

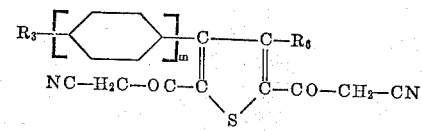

in which $R_6$ represents a member selected from the group consisting of a phenyl and a naphthyl radical and $R_3$ represents an alkyl radical containing at least 5 carbon atoms, and $m$ and $n$ each represents a whole number of at most 2.

3. A light-sensitive photographic silver halide layer for the color coupling development process, which contains as a coupler for the magenta dyestuff a thiophene compound of the formula

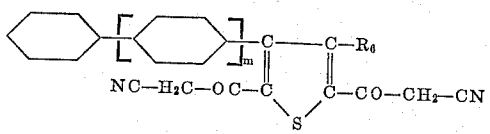

in which $R_6$ represents a member selected from the group consisting of a phenyl and a naphthyl radical and $m$ and $n$ each represents a whole number of at most 2.

4. A light-sensitive photographic silver halide layer for the color coupling development process, which contains as a coupler for the magenta dyestuff the thiophene compound of the formula

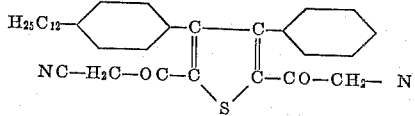

5. A light-sensitive photographic silver halide layer for the color coupling development process, which contains as a coupler for the magenta dyestuff the thiophene compound of the formula

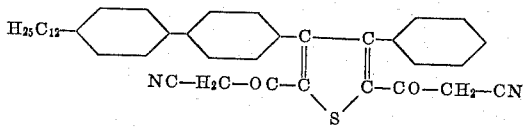

6. A light-sensitive photographic silver halide layer for the color coupling development process, which contains as a coupler for the magenta dyestuff the thiophene compound of the formula

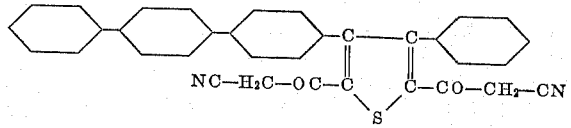

7. In a process for the production of a color photograph with the aid of silver halide and color couplers the step which comprises developing a magenta image by means of a primary aromatic amino photographic developer which contains as color coupler a thiophene compound of the formula

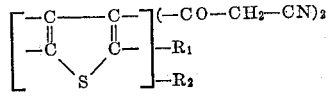

in which $R_1$ and $R_2$ each represents a member selected from the group consisting of a hydrogen atom, an aryl radical, an alkylaryl radical, an acylamino group containing at least 10 carbon atoms, a methylmercapto radical of the formula —S—CH$_2$—R$_5$, in which $R_5$ represents a member selected from the group consisting of a hydrogen atom, a —COOH, —COOCH$_3$, —COOC$_2$H$_5$ and —CN radical.

8. In a process for the production of a color photograph with the aid of silver halide and color couplers the step which comprises developing a magenta image by means of a primary aromatic amino photographic developer which contains as color coupler a thiophene compound of the formula

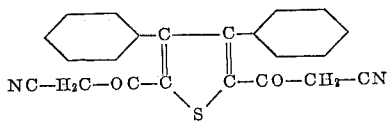

References Cited
UNITED STATES PATENTS

| | | | |
|---|---|---|---|
| 2,680,732 | 6/1954 | Martin | 96—100 |
| 2,865,929 | 12/1958 | Beaver et al. | 260—332.2 |
| 2,897,079 | 7/1959 | De Cat et al. | 96—55 |
| 3,034,891 | 5/1962 | Burgardt et al. | 96—55 |
| 3,094,657 | 6/1963 | Schorr et al. | 260—332.2 |

J. TRAVIS BROWN, *Primary Examiner.*

NORMAN G. TORCHIN, *Assistant Examiner.*